(12) United States Patent
Poon

(10) Patent No.: US 8,734,288 B2
(45) Date of Patent: May 27, 2014

(54) PLANET CARRIER ASSEMBLY

(75) Inventor: Siu Yun Poon, Nottingham (GB)

(73) Assignee: Romax Technology Limited, Nottingham (GB)

(*) Notice: Subject to any disclaimer, the term of this patent is extended or adjusted under 35 U.S.C. 154(b) by 0 days.

(21) Appl. No.: 13/477,106

(22) Filed: May 22, 2012

(65) Prior Publication Data

US 2012/0302395 A1  Nov. 29, 2012

(30) Foreign Application Priority Data

May 25, 2011  (GB) .................................. 1108773.1

(51) Int. Cl.
*F16H 57/08*  (2006.01)
(52) U.S. Cl.
USPC ........................................................ 475/331
(58) Field of Classification Search
None
See application file for complete search history.

(56) References Cited

U.S. PATENT DOCUMENTS

| | | | | |
|---|---|---|---|---|
| 440,717 A * | 11/1890 | Mower | ........................... | 105/55 |
| 2,103,259 A * | 12/1937 | Hitt | ................................ | 475/10 |
| 4,043,216 A * | 8/1977 | Steer | ................................ | 74/410 |
| 4,759,235 A * | 7/1988 | Hiramitsu et al. | ............. | 475/339 |
| 4,882,943 A * | 11/1989 | Pipon et al. | ...................... | 74/409 |
| 5,558,594 A * | 9/1996 | Lefranc et al. | ................ | 475/347 |
| 6,872,049 B2 * | 3/2005 | Christensen | ................ | 415/124.1 |
| 7,090,465 B2 | 8/2006 | Flamang et al. | | |
| 8,016,716 B2 * | 9/2011 | de Ugarte et al. | ............. | 475/331 |
| 8,313,412 B2 * | 11/2012 | Montestruc | ................... | 475/346 |
| 2003/0232692 A1* | 12/2003 | Chen | ............................... | 475/331 |
| 2006/0160655 A1* | 7/2006 | Smook et al. | .................. | 475/331 |
| 2011/0245031 A1* | 10/2011 | Saenz De Ugarte Sevilla et al. | ............................. | 475/347 |

* cited by examiner

*Primary Examiner* — Dirk Wright

(57) ABSTRACT

A gearbox assembly comprising of at least one planetary gear set comprising one or more ring gears, one or more sun gears and a planet carrier. The planet carrier supports two sets of circumferentially spaced planet gear bearings, pins and planet gears. The bearings, pins and gears are able to self adjust in an angular direction relative to the carrier supporting disc whereby the rotation axis of the planet gears may remain perpendicular to the plane of the planet carrier or skewed from said plane.

7 Claims, 3 Drawing Sheets

PLANET CARRIER ASSEMBLY

CROSS-REFERENCE TO RELATED APPLICATIONS

This application claims the benefit of U.K. Patent Application No. GB 1108773.1, filed May 25, 2011.

BACKGROUND OF THE INVENTION

The present invention relates to a planet carrier assembly.

Traditional wind turbine gearboxes involve the use of one or more planetary gear sets to reduce the torque and increase the speed of the power supplied by the rotor. One disadvantage of using a planetary gear set in high power applications is the load that planet gears and bearings must take is quite large. A current solution to this problem is to increase the number of planets in the gear set however this has the consequence of limiting the ratio achievable out of the set.

U.S. Pat. No. 7,090,465 (FIG. 1) suggests a method whereby additional planets are added to the system by the use of a double sided carrier (or bogie plate). This has the advantage of reducing the load on the planet gears and bearings while allowing higher ratio's to be achieved. The design claimed however has the disadvantage of requiring a common pin 44 for each opposing pair of planet gears 47. Consequently the planet gears on each side of the carrier are not completely independent and loads on one planet gear will affect the gears utilizing the common pin, this is of particular concern in flexible pin applications.

U.S. Pat. Appl. No. 2006/016055A1 (FIG. 1) discloses how an external force will cause a shaft of the so-called flexpin type, such as described in GB1101131, to bend as a result of a bending moment. A. The use of the flexible pin, or flexpin, 44 is advantageous for load distribution over the tooth flanks (KHβ) as well as load sharing between the planets in the planetary cell (Kγ). The equality of loads between the planets (Kγ) will be inversely proportional to the stiffness of the planet shafts and it is thus preferred to make the planet shafts as flexible as possible.

BRIEF SUMMARY OF THE INVENTION

The current invention details a design in which the pins and subsequent gears are offset ensuring that each pin in the system is independent of loads on other pins.

According to a first aspect, the present invention provides a planetary gear set comprising: a ring gear; a sun gear; and a planet carrier. The planet carrier supports a first set of planet gears and a second set of planet gears. Each of the gears meshes with the ring gear and the sun gear. The first set of planet gears is circumferentially spaced from the second set of planet gears. The first set of planet gears and the second set of planet gears able to self adjust in an angular direction relative to the carrier. This means that a rotational axis of the planet gears may remain perpendicular to a plane of the planet carrier or skewed from the plane.

Preferably, each set of planet gears is positioned on opposite sides of a central disc, which is either mounted to or integral with the planet carrier Preferably, the first set of planet gears and the second set of planet gears are offset in a circumferential direction by an angle of more than zero degrees.

Preferably, the first set of planet gears and the second set of planet gears comprise pins carrying a single planet gear.

Preferably, the first set of planet gears and the second set of planet gears comprise flex pins.

Also disclosed is gearbox assembly comprising at least one planetary gear set of the foregoing.

Also disclosed is a wind turbine comprising the gearbox assembly.

DETAILED DESCRIPTION OF THE INVENTION

Figure 1:
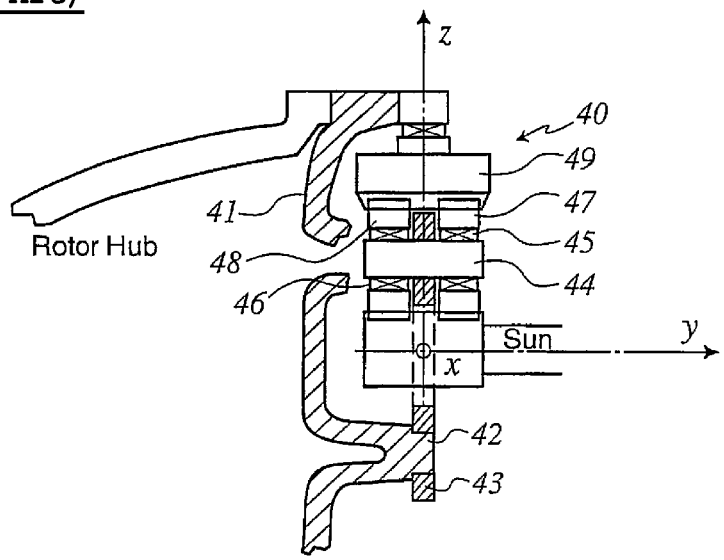
FIG. 1 is a schematic of the prior art system disclosed in U.S. Pat. No. 7,090,465.
Figure 2:
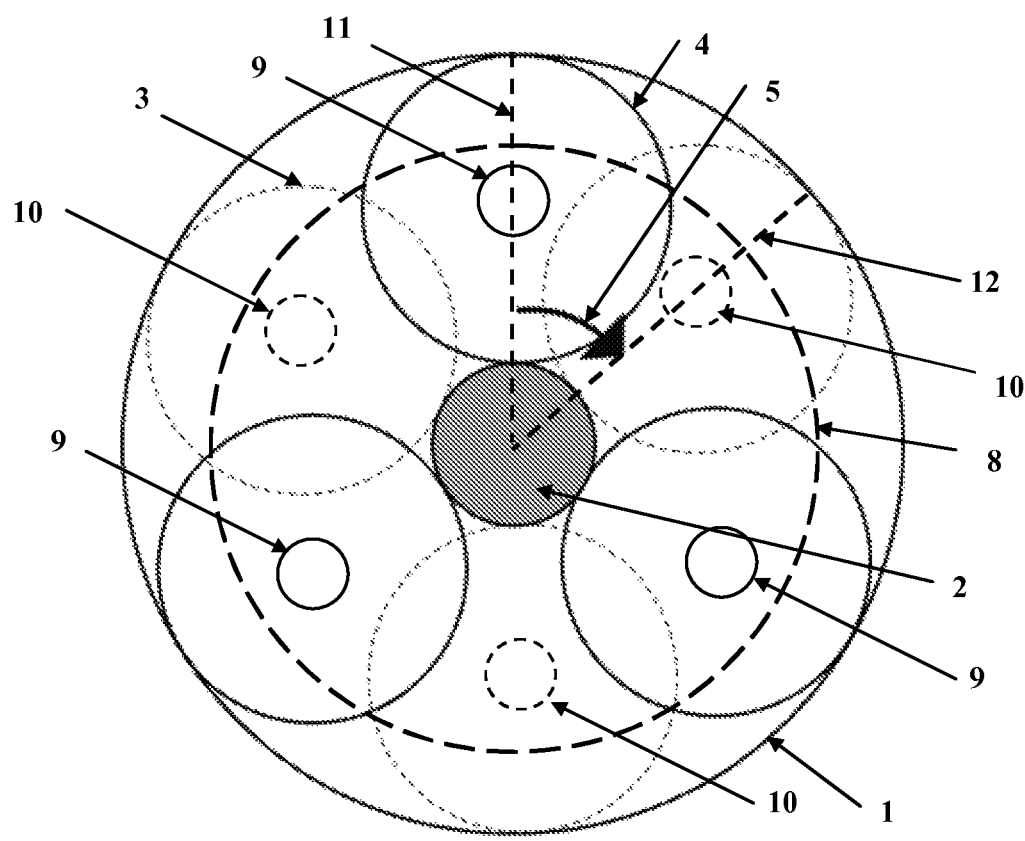
FIG. 2 is a schematic of the invention involving 6 planet gears, 3 on each side of the carrier.

FIG. 2 shows an elliptical or planetary gear set comprising a ring gear 1, a sun gear 2, a planet carrier 8, a first planet gear set 4, and a second planet gear set 3. The first planet gear set 4 is axially forward of the second planet gear set 3, the first planet gear set 4 located on one side of a central disc carrier 8 (position shown by the dotted line) and the second planet gear set 3, indicated by a dotted line, located on the other side of the central disc carrier 8. Both sets of planet gears mesh with ring gear 1 and sun gear 2. The position of planet pins 9 and 10 respectively supporting first planet gear set 4 and second planet gear set 3 is shown. The two sets of planet gears and associated pins and bearings are circumferentially offset from each other. This is indicated in FIG. 2 by an angle 5 between a line 11 passing through the centre of one of the first planet gear set 4 and the centre of the sun gear 2, and a line 12 passing through the centre of one of the second planet gear set 3 and the centre of the sun gear 2. The angle may be any angle greater than 0 degrees.

This arrangement, in which the planet carrier supports two sets of circumferentially spaced planet gear bearings, pins and planet gears, allows the rotation axis of the planet gears to remain perpendicular to the plane of the planet carrier or to be skewed from the plane, which in turn permits the bearings, pins and gears to self adjust in an angular direction relative to the carrier supporting disc.

Each of pins 9, 10 carry a single planet gear. The pins may be flex pins.

Figure 3:
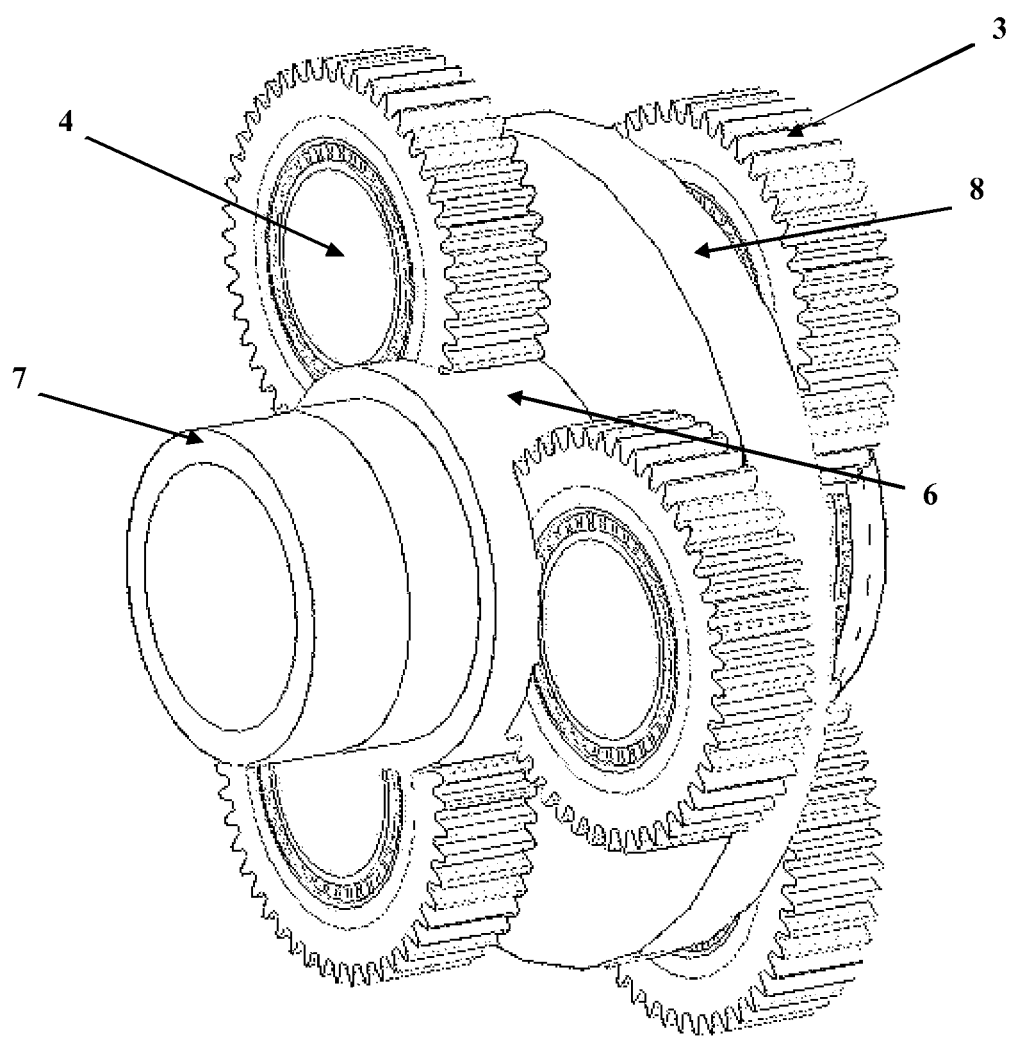
FIG. 3 is a 3D view of the proposed invention showing the one possible location of the planet gears in relation to each other

FIG. 3 shows in more detail a simple implementation of the invention focusing only on the planet carrier; sun and ring gears are not shown for clarity. Power is input to the planet carrier 6 through a connector 7 at the front of the carrier. The two sets of planet gears 3,4, pins 9,10 and associated bearings (not shown) are mounted in an offset manner to the carrier 6 via central disc carrier 8.

The planet carrier supports two sets of circumferentially spaced planet gear bearings, pins and planet gears, the bearings, pins and gears being able to self adjust in an angular direction relative to the carrier supporting disc. The rotation axis of the planet gears may remain perpendicular to the plane of the planet carrier or skewed from the plane.

The embodiments described in the figures concentrates on a case where 2 sets of 3 planets are used. However any number of planets may be used in the system and the design ensues it is possible to use a different number of planets on either side of the carrier is so desired.

Figure 4:
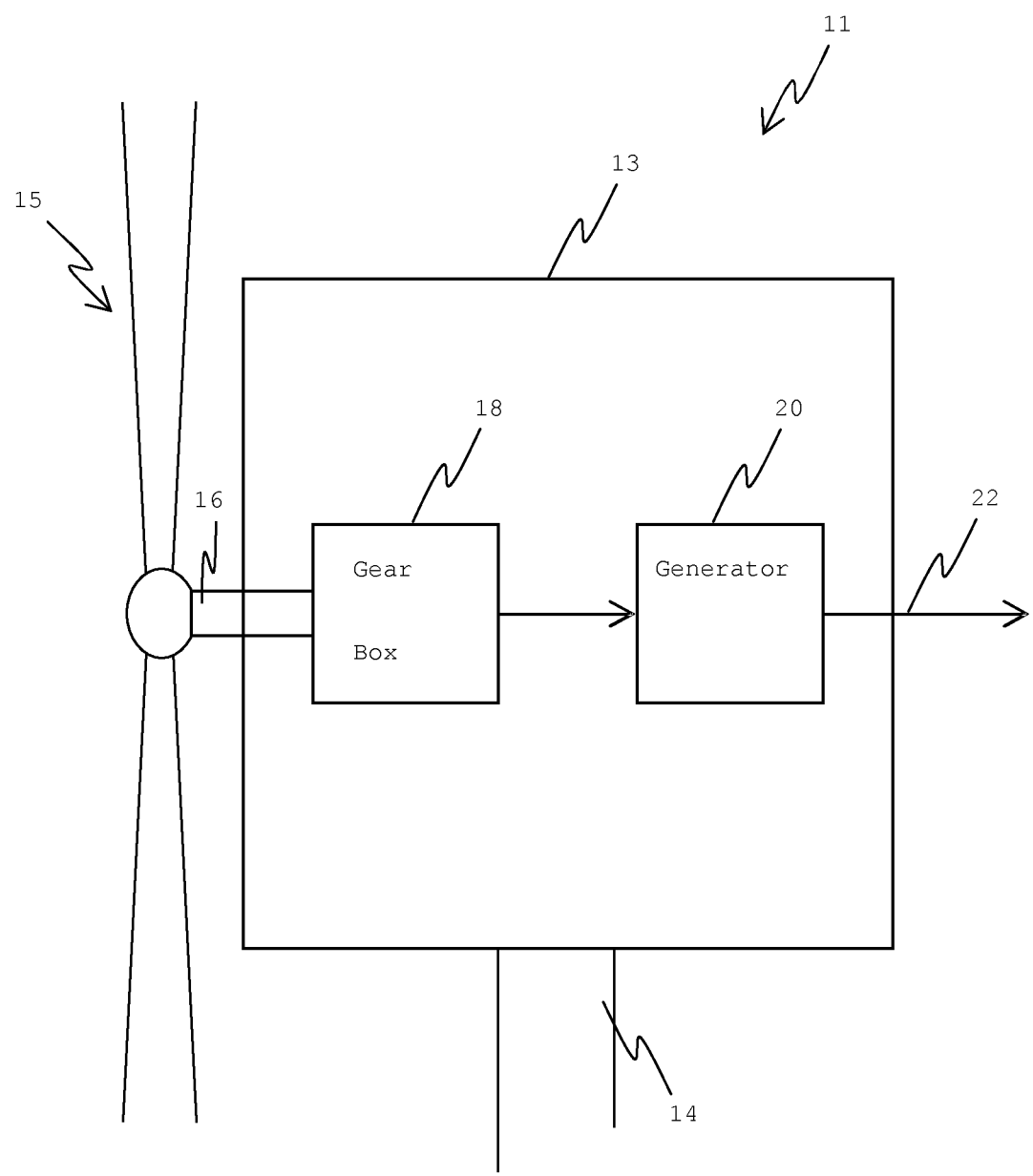
FIG. 4 illustrates a schematic diagram of a wind turbine according to various embodiments of the invention.

The elliptical or planetary gear set described above can be used in a gearbox assembly. The gearbox assembly can be used in the wind turbine 11 shown in FIG. 4. In addition to the gearbox assembly 18, the wind turbine includes a nacelle 13 (which may also be referred to as a turbine housing), a support post 14, a rotor 15, a rotor shaft 16, and a generator 20. The wind turbine 10 is arranged to convert wind energy to electrical energy. The wind turbine 10 may be installed off-shore or may be installed inland.

The invention claimed is:

1. A planetary gear set comprising: a ring gear; and a planet carrier, said planet carrier supporting a first set of planet gears and a second set of planet gears, said first set of gears being axially forward of said second set of gears; said planetary gear set further consisting of a sun gear, each of said planet gears meshing with said ring gear and said sun gear; wherein said first set of planet gears is circumferentially spaced from said second set of planet gears, and wherein said first set of planet gears and said second set of planet gears able to self adjust in an angular direction relative to the carrier, whereby a rotational axis of said planet gears may remain perpendicular to a plane of said planet carrier or skewed from said plane.

2. The planetary gear set of claim 1 wherein each set of planet gears is positioned on opposite sides of a central disc either mounted to or integral with said planet carrier.

3. The planetary gear set of claim 1 wherein said first set of planet gears and said second set of planet gears are offset in a circumferential direction by an angle of more than zero degrees.

4. The planetary gear set of claim 1 wherein said first set of planet gears and said second set of planet gears comprise pins carrying a single planet gear.

5. The planetary gear set of claim 1 wherein said first set of planet gears and said second set of planet gears comprise pins comprise flex pins.

6. A gearbox assembly comprising at least one planetary gear set of claim 1.

7. A wind turbine comprising said gearbox assembly of claim 6.

* * * * *